March 17, 1964     F. WEINZIERL     3,125,139
CIRCULAR SAW BLADES FOR OPERATION IN A COMMON KERF
Filed Jan. 31, 1962
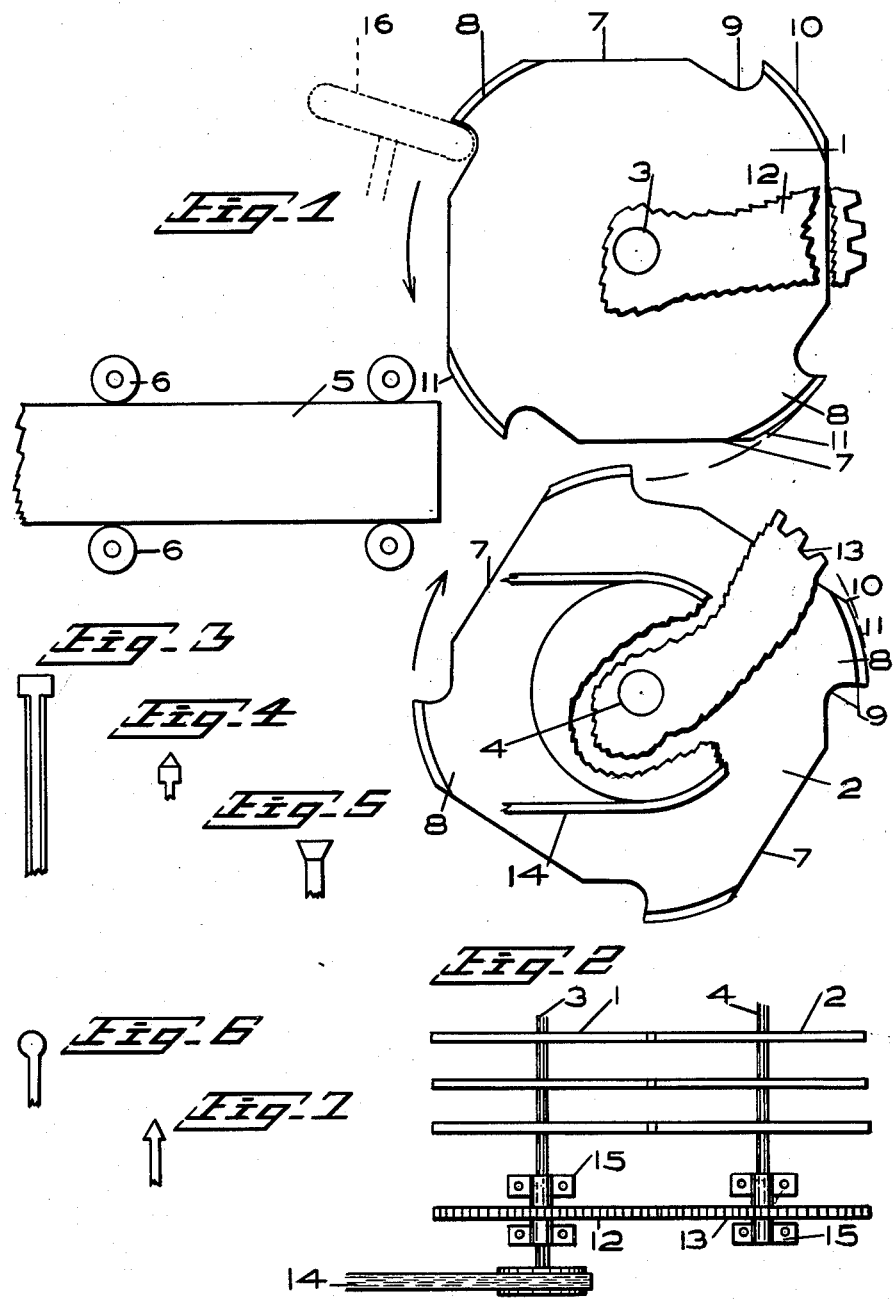

United States Patent Office 3,125,139
Patented Mar. 17, 1964

3,125,139
CIRCULAR SAW BLADES FOR OPERATION IN A COMMON KERF
Franz Weinzierl, Nakusp, British Columbia, Canada (2667 E. 57th Ave., Vancouver 16, British Columbia, Canada)
Filed Jan. 31, 1962, Ser. No. 170,143
1 Claim. (Cl. 143—40)

This invention relates to circular saws, having particular reference to an improved saw blade by which a pair of blades aligned for travel in a common kerf of timber passed between the blades may make a complete cut without clashing.

Circular saw blades more usually have teeth formed or insertable in the entire periphery of the blade, a single blade making the cut through the timber, or a series of parallel blades spaced apart as in gang saws but each making a separate cut.

The present invention is concerned with providing an improved blade by which two such blades mounted on parallel arbors may combine in a common cut with the teeth of each blade passing through spaces formed by cut away portions of its companion blade, so that no clashing of the teeth may occur and the two blades may combine in making a complete cut.

In the drawings, wherein is illustrated a preferred embodiment of the invention, FIG. 1 shows an end view of a pair of arbors on which are mounted blades in accordance with my invention, shown with the blades broken away to disclose gearing by which the two arbors are connected to turn oppositely and including a belt and pulley drive connection, and further indicating a piece of timber passing through rolls to be fed to the saw blades.

FIG. 2 shows a top view, broken away, illustrating a series of such blades combined in a gang saw and including the gearing and a belt and pulley drive for the arbors.

FIGS. 3 to 7 show edge views of fragments of a blade, illustrating teeth used for different types of timber.

In the drawings, a pair of blades 1 and 2 are shown mounted on parallel arbors 3 and 4, in relation to which a piece of timber 5 is shown mounted between feed rolls 6 for passing between the blades.

These blades have each four portions 7 cut away tangential to the radii of the blade and forming two pairs of opposing sides with intervening teeth sections 8 having gullets 9. Welded, or suitably fixed, on the sections 8 are elongated teeth 10, tapering rearwardly inwards, as indicated at 11, maintaining a slight clearance rearward of the cutting faces of the teeth.

The arbors 3 and 4 are connected by gears 12 and 13, and driven by a belt 14, as shown in FIGURE 2, it being understood one or more pairs of blades could be employed. Bearing brackets at 15 are indicated for the arbors.

The arbors 3 and 4 are spaced apart an amount that allows the teeth of each blade to move through the path of travel of the teeth of its companion blade, for which the cut away portions 7 are provided, the blades being set on the arbors with the teeth of each blade of a pair passing through the kerf in opposing relation to the cut away portion 7 of the other blade of the pair. Such a common path of travel in the kerf may be slight in depth, but should take into account the relieving at 11 of the teeth 10. As the teeth 10 are ground away at their forward cutting ends in sharpening the teeth, as by the grinding element at 16 in FIGURE 1, the greatest diameter of the blade is reduced and such reduction must be considered in mounting the saw blades in relation to each other so that there is always overlap of the blades to make a complete cut.

In the use of the device, a pair of opposing blades could be used, or a series of pairs as shown in FIGURE 2 forming a gangsaw, and these blades must have their sides sufficiently cut away that the teeth of one blade may pass through the spaces left by the cut away portions of its companion blade so as to make a complete cut without clashing.

While four cut away portions are specified it is to be understood that this is illustrative and not to be taken as limitative.

Having thus particularly described my invention, what I claim and wish to secure by Letters Patent is:

A sawmill having one or more pairs of circular blades of a common diameter and parallel arbors on which the blades are mounted with the blades of each pair aligned for travel in a common kerf, said blades having cut away portions therein, in which the arbors are spaced apart less than the overall diameter of a blade and formed with each blade cut away at intervals on straight lines tangential to imaginary circles concentric with but of less diameter than the saw blades, and including a single tooth on the peripheral uncut portions of the blade rearwardly of each sawdust gullet and with said teeth spaced at quarterly intervals on the blade, the saw blades mounting on the arbors in relation to each other by which the teeth of each blade are aligned with their points extending centrally in relation to the cut away portion of the opposing blade.

References Cited in the file of this patent
UNITED STATES PATENTS

| | | |
|---|---|---|
| 684,764 | Cunningham | Oct. 15, 1901 |
| 1,629,742 | Scott | May 24, 1927 |
| 2,559,355 | Grupp | July 3, 1951 |
| 2,664,926 | Fuglie | Jan. 5, 1954 |

FOREIGN PATENTS

| | | |
|---|---|---|
| 124,636 | Australia | June 18, 1947 |